United States Patent
McNeely et al.

(10) Patent No.: US 12,261,833 B2
(45) Date of Patent: Mar. 25, 2025

(54) SYSTEM AND METHOD FOR SAFELY RELAYING AND FILTERING KERBEROS AUTHENTICATION AND AUTHORIZATION REQUESTS ACROSS NETWORK BOUNDARIES

(71) Applicant: DELINEA INC., Redwood City, CA (US)

(72) Inventors: David Forrest McNeely, San Jose, CA (US); Peter Gerardus Jansen, Goirle (NL); Clifford Van Slimming, Almere (NL); Bob Janssen, Bonaire CN (NL)

(73) Assignee: DELINEA INC., Redwood City, CA (US)

( * ) Notice: Subject to any disclaimer, the term of this patent is extended or adjusted under 35 U.S.C. 154(b) by 199 days.

(21) Appl. No.: 18/047,878

(22) Filed: Oct. 19, 2022

(65) Prior Publication Data
US 2024/0137355 A1 Apr. 25, 2024
US 2024/0236069 A9 Jul. 11, 2024

(51) Int. Cl.
*H04L 29/06* (2006.01)
*H04L 9/40* (2022.01)

(52) U.S. Cl.
CPC ...... *H04L 63/0807* (2013.01); *H04L 63/0236* (2013.01)

(58) Field of Classification Search
None
See application file for complete search history.

(56) References Cited

U.S. PATENT DOCUMENTS

| | | |
|---|---|---|
| 8,510,818 B2 | 8/2013 | Garg et al. |
| 9,450,944 B1 | 9/2016 | Sousley et al. |
| 11,394,710 B1 | 7/2022 | Royal et al. |

(Continued)

FOREIGN PATENT DOCUMENTS

WO 2019/000092 A1 1/2019

OTHER PUBLICATIONS

Anonymous: "Ivanti Cloud Relay", The Wayback Machine Retrieved from URL:https://web.archive.org/web/20211208220658/https://help.ivanti.com/res/help/en_US/IWC/2021/Help/Content/10025.htm, Dec. 8, 2021, 1 page.

(Continued)

*Primary Examiner* — Jeffery L Williams
(74) *Attorney, Agent, or Firm* — WOMBLE BOND DICKINSON (US) LLP

(57) ABSTRACT

A system and method for providing secure access to an organization's internal resources by an application running on an external network. An agent accepts queries from the application which are passed to a relay with a dynamic filter. The relay establishes a secure connection with a connector through the organization's firewall and passes requests from the application to an authentication service running on the internal network to confirm that a user of the application is authorized and issue an authentication ticket which is returned to the application. The application then sends a request to access a specific internal resource based on the authentication ticket, which is passed to a ticket granting service running on the internal network, to verify that said user is authorized to access the specific internal resource, and, if so, issue a service ticket to grant access the application for that resource.

5 Claims, 8 Drawing Sheets

(56) References Cited

U.S. PATENT DOCUMENTS

| | | |
|---|---|---|
| 2005/0108575 A1 | 5/2005 | Yung |
| 2016/0164869 A1* | 6/2016 | Young .................. H04L 63/061 |
| | | 726/7 |
| 2018/0159856 A1* | 6/2018 | Gujarathi ............ H04L 63/0281 |
| 2018/0219862 A1* | 8/2018 | Young .................. H04L 63/061 |
| 2018/0255021 A1* | 9/2018 | Pellizzer ................ G06F 21/62 |
| 2022/0150703 A1* | 5/2022 | Raju .................. H04L 12/4641 |
| 2024/0137355 A1* | 4/2024 | McNeely .............. H04L 9/3213 |
| 2024/0236069 A9* | 7/2024 | McNeely .............. H04L 63/029 |

OTHER PUBLICATIONS

Db Tech: "Restrict Access to Your Cloudflare Tunnel Applications", Retrieved from the Internet URL: https://www.youtube.com/watch?v=65FdHRs0axE, XP093099345, Oct. 18, 2022, 2 pages.

European Search Report and Search Opinion received for EP Application No. 23204486.7, mailed on Nov. 30, 2023, 19 pages.

Fulvio, R., et al., "MIT Kerberos Consortium—Protocol Tutorial", Retrieved from the Internet: URL:http://www.kerberos.org/software/tutorial.html, XP055338186, Nov. 27, 2007, 10 pages.

* cited by examiner

SYSTEM AND METHOD FOR SAFELY RELAYING AND FILTERING KERBEROS AUTHENTICATION AND AUTHORIZATION REQUESTS ACROSS NETWORK BOUNDARIES

BACKGROUND OF THE INVENTION

In the prior art of data security, in a Kerberos environment, to accept and handle requests from outside a security boundary, to access a Kerberos Key Distribution Center (KDC), it is normally necessary to open firewall ports. By filtering on Layer 4 on source of the request, some security can be established, but this is not desirable. To maintain proper security protocols, organizations would like to enable intelligent least access without opening Open Systems Interconnection (OSI) model network layer 3 (Network) or 4 (Transport) connections, preferring instead to only allow layer 7 (Application) communications.

Kerberos is a layer 7 service which provides an authentication protocol that is used to verify the identity of a user or host. In general, Kerberos authentication protocol and extensions utilize public key authentication, transporting authorization data, and delegation.

The Kerberos KDC is integrated with other security services that run on a domain controller. For example, a KDC can use the domain's Active Directory® Domain Services database as its security account database. In a Windows environment, Active Directory® Domain Services is required for default Kerberos implementations within the domain or forest.

The benefits gained by using Kerberos for domain-based authentication include:

Delegated authentication: Kerberos authentication supports a delegation mechanism that enables a service to act on behalf of its client when connecting to other services.

Single sign on: Using Kerberos authentication within a domain or in a forest allows the user or service access to resources permitted by administrators without multiple requests for credentials. After an initial domain sign on, Kerberos manages the credentials throughout the forest whenever access to resources is attempted.

Interoperability: Modern implementations of Kerberos are based on standards-track specifications that are recommended by the Internet Engineering Task Force (IETF). As a result, in properly configured operating systems, the Kerberos protocol lays a foundation for interoperability with other networks in which the Kerberos protocol is used for authentication.

Improved authentication to servers: Before Kerberos, NTLM authentication could be used, which requires an application server to connect to a domain controller to authenticate every client computer or service. With the Kerberos protocol, renewable session tickets replace pass-through authentication. The server is not required to go to a domain controller (unless it needs to validate a Privilege Attribute Certificate (PAC)). Instead, the server can authenticate a client computer by examining credentials presented by the client. Client computers can obtain credentials for a particular server once and then reuse those credentials throughout a network logon session.

Mutual authentication: By using the Kerberos protocol, a party at either end of a network connection can verify that the party on the other end is the entity it claims to be.

Enterprises and other organizations are moving more of their internal network activities to cloud based services outside their internal networks. Cloud based services provide underlying hardware and support for applications, web sites, content distribution, and more under the care of a cloud based business. Organization members/employees can use cloud based services to perform work outside of the organization's internal-network premises. An organization's internal-network premises is also referred to as local, and any external network is considered to be in the cloud.

As an organization's network activities migrate outside of its internal network, those activities often require access to the organization's internal resources such as database servers. However, in a Kerberos environment, a local firewall normally prevents access by any requests from the cloud.

In the prior art, a KDC proxy for remote access can be set up as described for example in KDC Proxy for Remote Access, Steve on Security by Steve Syfuhs published May 27, 2020. (https://syfuhs.net/kdc-proxy-for-remote-access) The proxy is, in essence a web listener which relays messages from https://+:443/kdcproxy to a domain controller. It can be used, for example, to authenticate clients with a domain controller when there is no VPN in place or when it desired that external clients not be directly exposed to domain controllers. However, as explained in Detecting and Preventing Privilege Escalation attacks leveraging Kerberos Relaying (KrbRelayUp) by Microsoft 365 Defender Research Team published May 25, 2022 (Detecting and preventing privilege escalation attacks leveraging Kerberos relaying (KrbRelayUp)—Microsoft Security Blog), in hybrid identity environments where organizations synchronize their domain controllers with Azure Active Directory® (AD), if an attacker compromises an Azure virtual machine using a synchronized account, they will receive system privileges on the virtual machine. Organizations can mitigate the impact of this threat as explained in *Kerberos: Why and When you Should use it* by Brandon Lee pubhlished May 6, 2022, where the use of a version of Azure AD referred to as Azure AD Kerberos announced by Microsoft® in December 2021 is described. This document describes adding Kerberos support to Azure AD which is only supported in Azure cloud. That is, Azure AD Kerberos supports clients outside an organization getting Kerberos tickets from Azure AD, but not from the organization's internal AD. As such, access to internal resources secured by Kerberos also inaccessible from the cloud. Microsoft® Windows has its own implementation of Kerberos such that the KDC is a Windows Domain Controller. However, for purposes of the invention, whether or not the KDC is implemented as a Windows Domain Controller is not relevant.

FIGS. 1-4 illustrate Various prior art Kerberos authentication workflows. FIG. 1 shows a prior art standard Kerberos authentication workflow when a user sends an authentication request for a resource using a KDC which consists of a ticket granting service, an authentication service and a Kerberos database. FIG. 1 is a generic workflow description which shows how authentication requests are sent to an authentication service which checks a Kerberos database so that a Kerberos authentication ticket (TGT) can be issued to the requester. Specifically, at 1, a user 11 sends an authentication request to authentication service 15. At 2, the authentication service determines whether the user exists in the Kerberos database 17. At 3, assuming the user exists in the database, the authentication service issues a TGT to that user. At 4, the TGT is then sent to a Ticket Granting Service (TGS) 13 which at 5 checks the Kerberos database to see if the user is allowed access to an internal resource 19 such as a database. If so, at 6 the TGS issues a service ticket which the user can then use at 7 to seek and obtain access to the resource 19 which at 8, grants access to the user.

FIG. 2 shows a specific case of a prior art application workload Kerberos authentication workflow when a local application sends an authentication request for a resource to a local KDC. The flow in FIG. 2 is the same as in FIG. 1 except that the user is a locally based application which must be authenticated to access a resource which is a locally based database server 23 such as an Oracle® database server.

FIG. 3 shows a theoretical prior art application workload Kerberos authentication workflow when a cloud based application 21a sends an authentication request to a local KDC. FIG. 3 is similar to FIG. 2 except since the application is in the cloud, the authentication request at 1 is normally blocked by a local firewall 31. In this case, the authentication request is denied by the authentication service since the request came from a source outside the organization's local setting. Any request from the cloud based application for a service ticket would similarly be denied. It may be possible to bypass the firewall by providing special incoming connections through the organization's firewall. However, these can be difficult to set up and can compromise security.

FIG. 4 shows a theoretical prior art application workload Kerberos authentication workflow when a cloud based application sends an authentication request with a cloud based KDC less the local TGS. It is similar to FIG. 3 except that since the Authentication Service and Kerberos database have a cloud based realm, at 3, the TGT is issued. However, when the cloud based application sends the issued TGT to a local TGS to obtain access to a local resource, it is blocked by the local firewall 31.

In FIGS. 3, the flow after the authentication request is blocked, although shown, since the request sent to the TGS is blocked by the firewall, the subsequent flow never occurs. Similarly, in FIG. 4, the flow after the TGS request is shown but never occurs.

SUMMARY OF THE INVENTION

The invention is directed to a system to solve the problem of crossing security boundaries as shown in FIGS. 3-4 in a safe way utilizing a unique capability that addresses authorization challenges in hybrid environments of customers using Kerberos as a security mechanism.

Embodiments of this invention provide secure access to an organization's local resources such as database servers from external cloud based resources located on the Internet with local Kerberos databases. In some embodiments, a Kerberos database also exists in the cloud, but access to the local Kerberos database is still necessary. An embodiment of this invention allows an application running on an external network outside an organization's network firewalls to access local resources using existing local ticket granting and authentication services with a Kerberos database. Embodiments of this invention do not require special incoming connections through the organization's firewall which can be difficult to set up and can compromise security. In an embodiment, a Kerberos relay with dynamic filter is located between cloud based applications and the local resources. A locally based connector to the Kerberos relay provides a secure connection so that user authentication requests can be processed by the local authentication service and requests from the cloud based application can be processed by the local ticket granting service after which the cloud based application is allowed access to the local database server. The secure connection is set up by using the locally based connector to create a transport layer security (TLS) tunnel over port 443 to allow outbound traffic from the local system to the Kerberos relay with dynamic filter. Although it is known in the art how to create a transport layer security (TLS) tunnel over port 443 to allow outbound traffic from local system, the invention includes additional security mechanisms so that a cloud based application can obtain complete access to a local resource protected by a KDC.

An embodiment of the invention stands between these two existing components:

a) An internal Kerberos service with a ticket granting service, an authentication service and a Kerberos database running behind a firewall inside an organization's internal network with a local resource protected by a KDC based such as a database server.

b) An application which is a computer process that runs on an external network (that is, in the cloud) to the local network and seeks to make use of a local resource service. The application that uses the invention runs in the cloud and has access to the local resources using local Kerberos security protocols as explained herein. This application is not part of the invention, and can be any application running in the cloud seeking access to local resources behind a firewall. An example of an application that uses the invention is a web based application which uses a local database as storage, such as an Oracle® database using domain credentials to authenticate to it.

An embodiment of the invention has as one component referred to as a Kerberos relay with dynamic filtering that runs as a Software as a Service (SaaS), a second component referred to as connector that runs locally being a firewall and a third component which acts as an agent interfacing with the web bases application.

This, SaaS is a process that accepts queries from external applications for access to internal/local resources via Kerberos authentication and passes those queries on to the connector located in an organization's internal network. The SaaS obtains authorization requests from an external application and establishes a secure connection with the connector after which the external application, the SaaS process and connector process requests for a TGT and a TGS which the external application can then use to access the internal resource.

In an embodiment, the authentication service and a Kerberos database can reside in a cloud realm, but the ticket granting service and a locally based Kerberos database are still required.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF INVENTION

The purpose of the invention is to safely authenticate and authorize clients to access a resource across security boundaries when using a Kerberos database.

An agent component on a cloud based client sets up a transport layer security (TLS) tunnel over port 443 to allow outbound traffic from the local system to the Kerberos relay with dynamic filter, secure tunnel with a relay component. The agent reconfigures the client to connect to a local agent instead of a target Kerberos Key Distribution Center (KDC) for authentication and authorization requests.

Connector components inside the security boundaries of a KDC set up secure tunnels with the relay component located outside an organization's firewall. This can be done for one or more security boundaries. One connector is used per security boundary.

A relay component running in the cloud receives connections from an authenticated agent component and a local connector component. The relay component filters requests coming in from the agent based on an allow list. The allow list specifies which User Principal Names (UPN) are acceptable. Other elements of the request can be checked as well. Based on the UPN, the request is then forwarded through the relevant connector. The connector receiving the request forwards it to the KDC in the security boundary. The relay retains that the UPN has requested authentication. Later, when an authorization request for a resource comes in, this is checked again with the allow list (now for a specific resource) and if the UPN was seen before by the relay.

Although relaying, reverse proxies and packet filtering are not new. The combination and flow of steps described is not known in art. It is also not obvious to perform these steps with the elements of the invention to solve the problem of crossing security boundaries in a safe way.

Implementation Details

Figure 1:
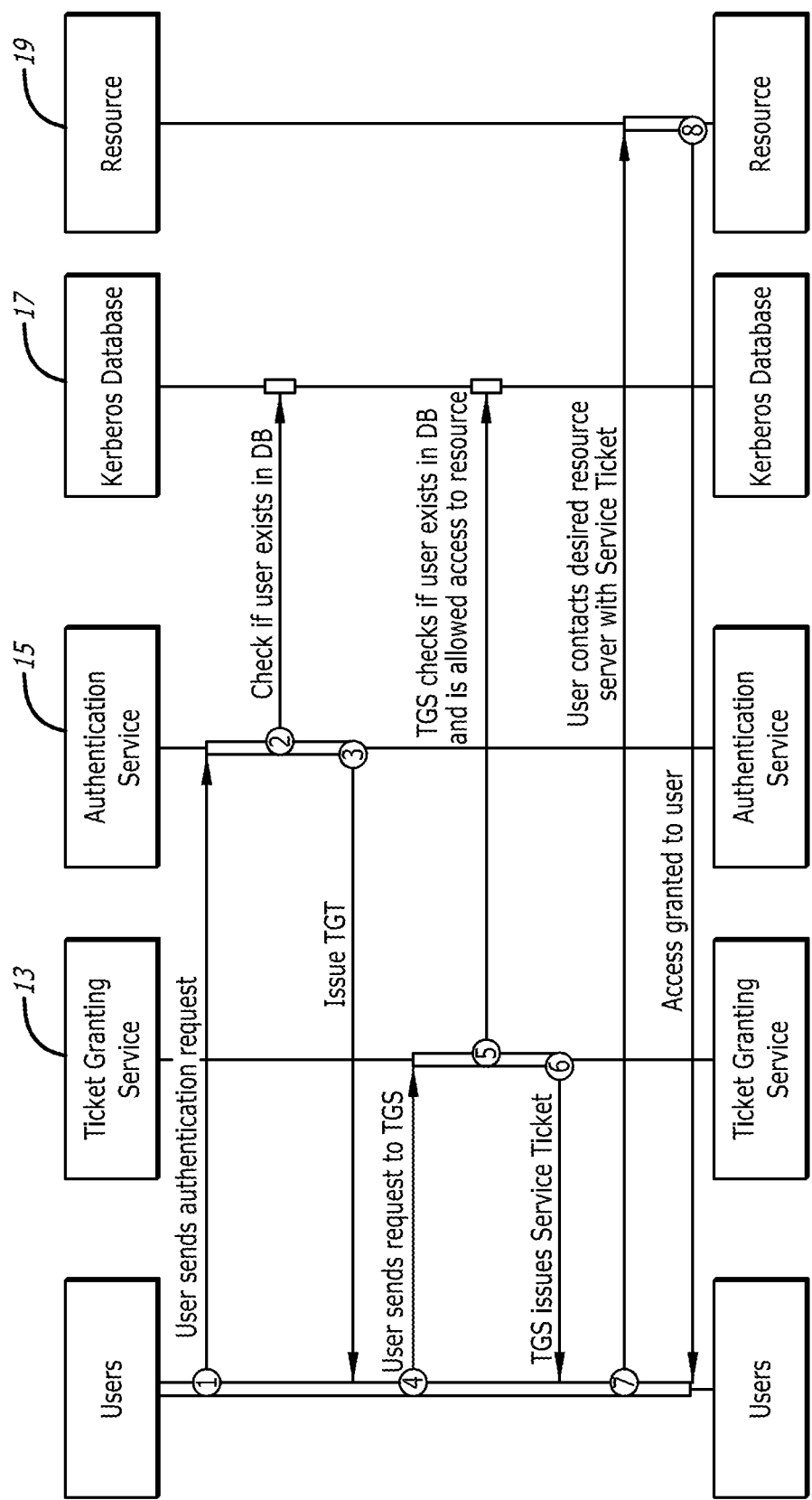
FIG. 1 shows a prior art standard Kerberos authentication workflow when a user sends an authentication request for a resource using a Kerberos Key Distribution Center.
Figure 2:
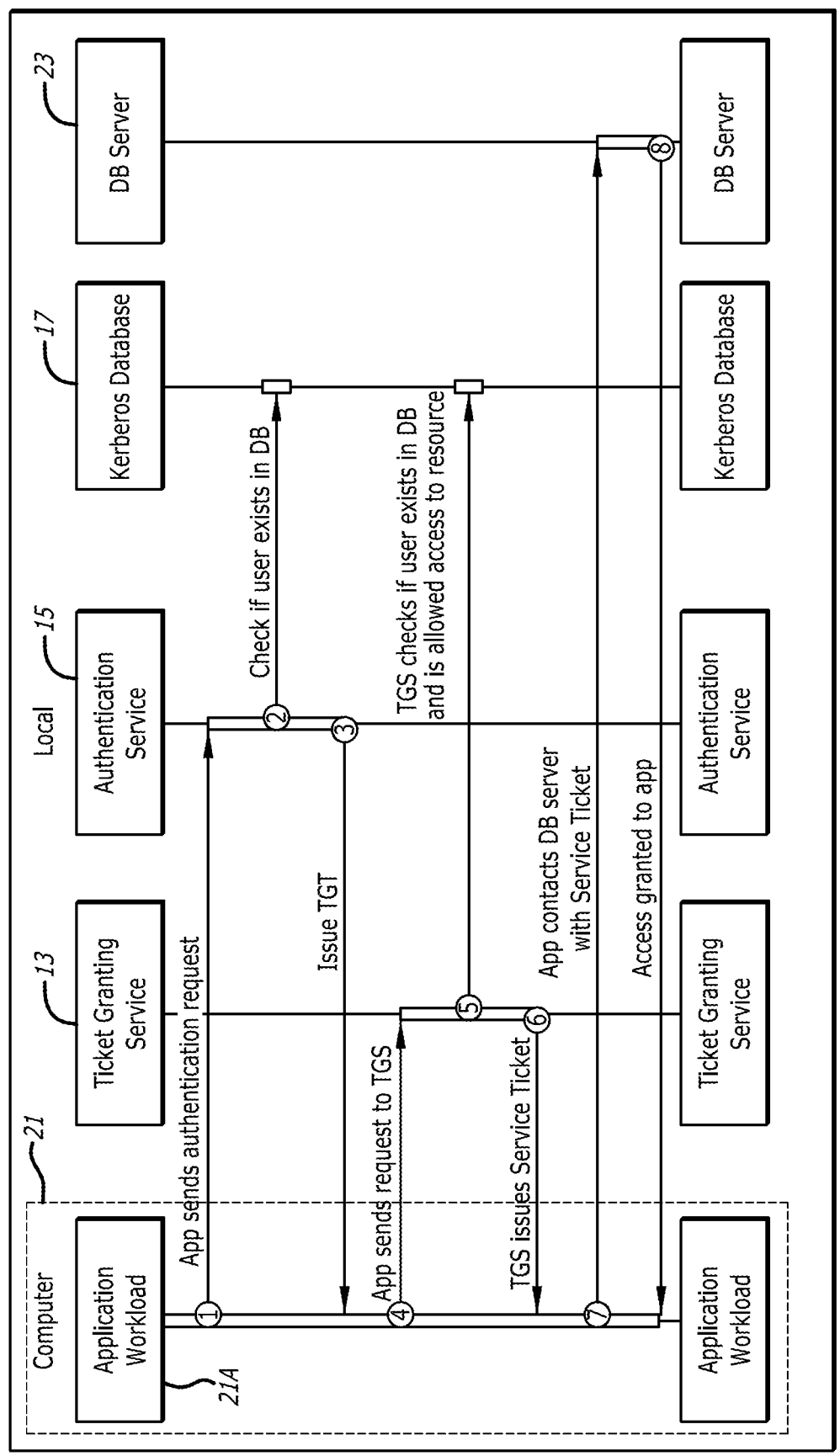
FIG. 2 shows a prior art application workload Kerberos authentication workflow when a local application sends an authentication request for a resource to a local Kerberos Key Distribution Center.
Figure 3:
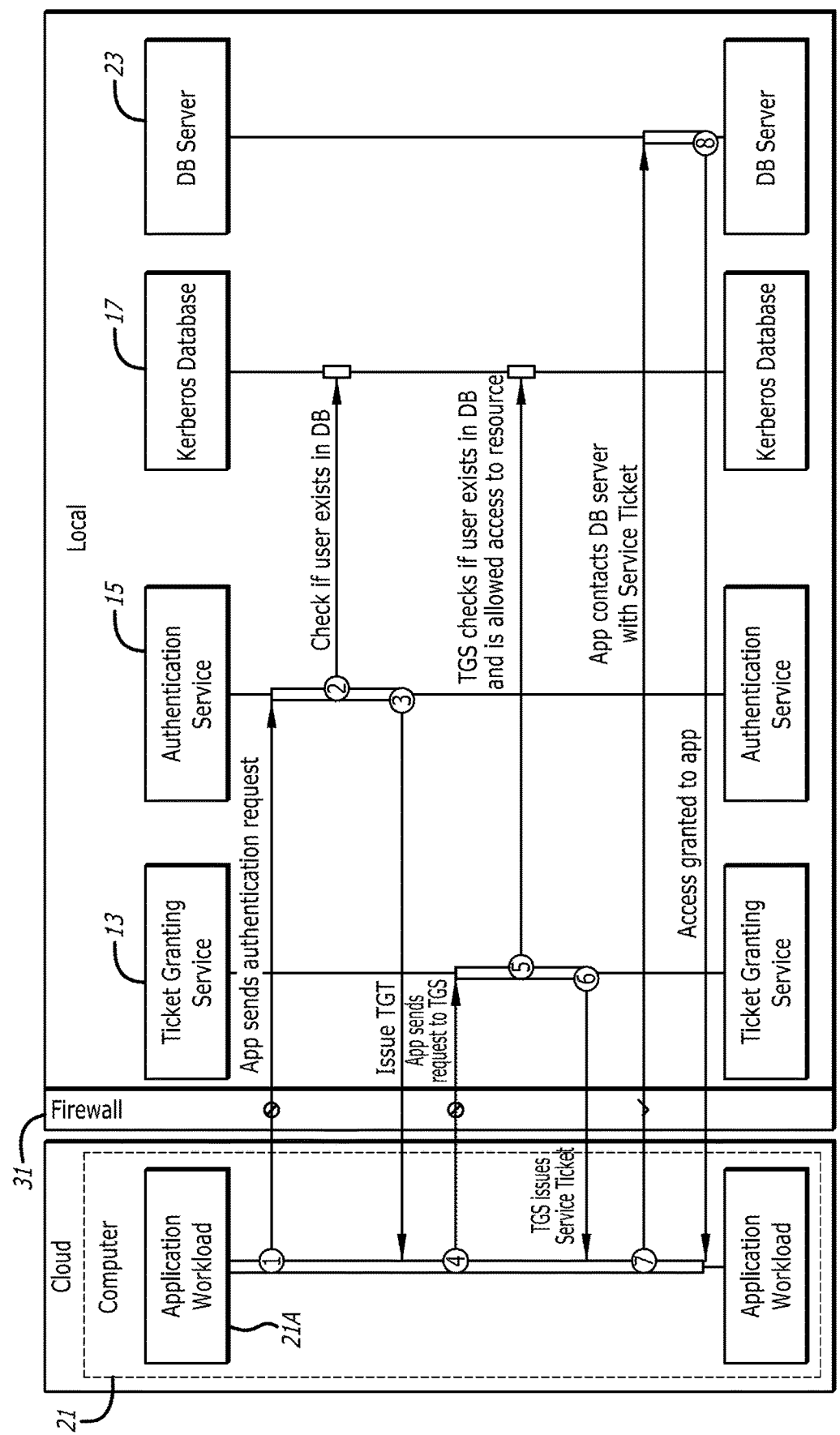
FIG. 3 shows a prior art application workload Kerberos authentication workflow when a cloud application attempts an authentication request to a local Kerberos Key Distribution Center.
Figure 4:
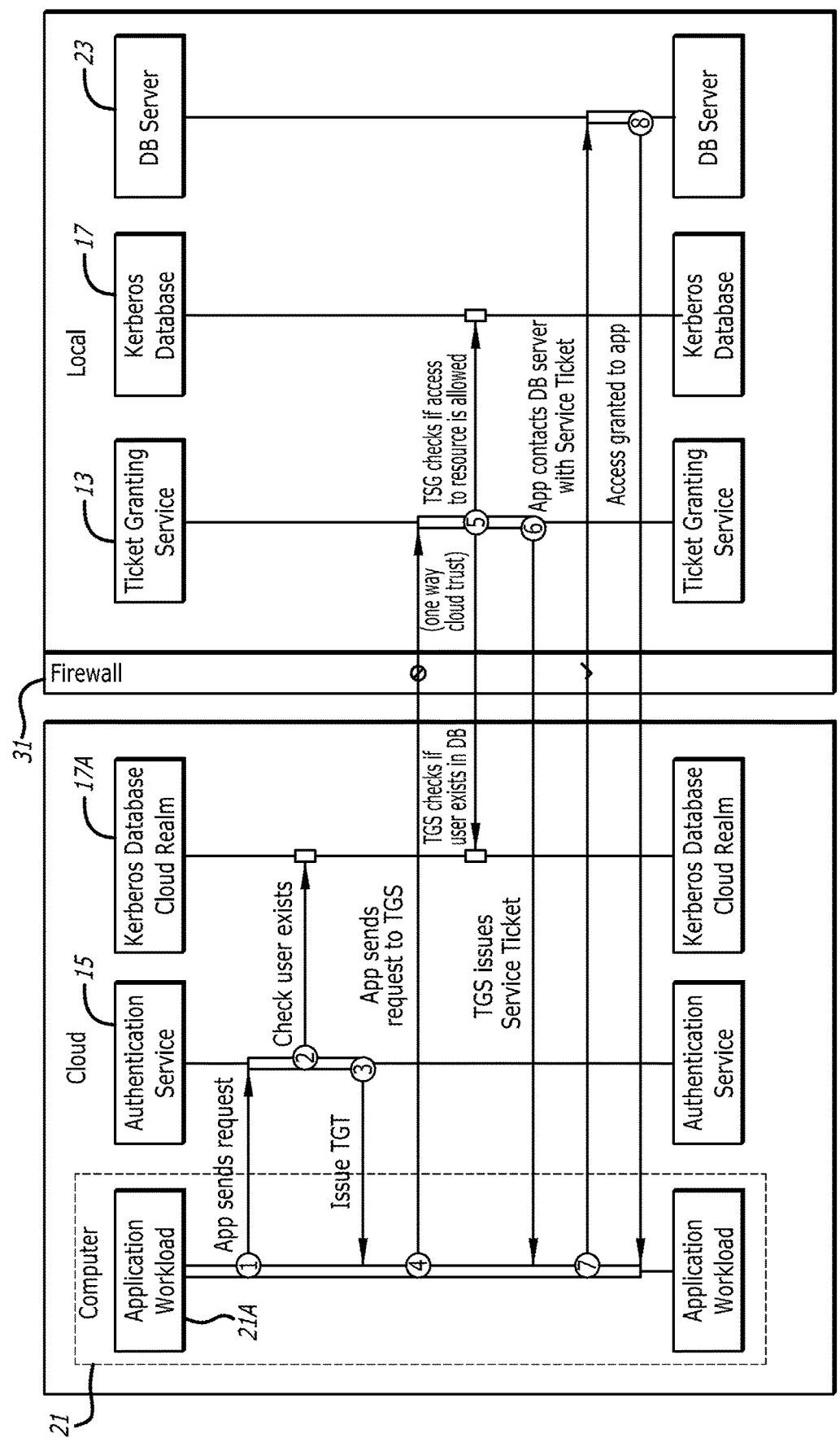
FIG. 4 shows a prior art application workload Kerberos authentication workflow when a cloud based application attempts an authentication request with a Kerberos Key Distribution Center in a cloud based realm.
Figure 5:
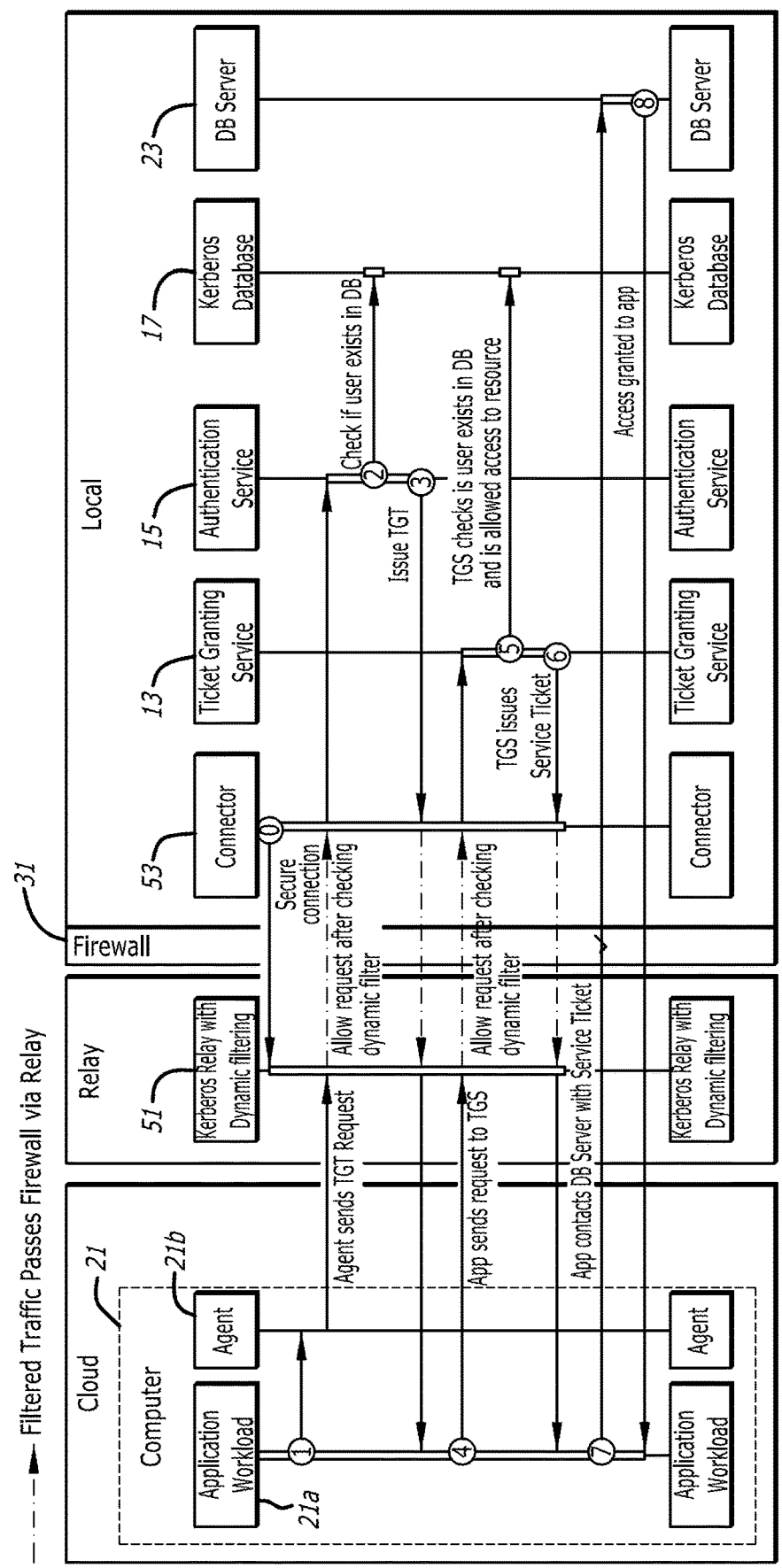
FIG. 5 shows an application workload Kerberos authentication workflow with dynamic filtering and connector according to the invention when a cloud application sends an authentication request to a local based Kerberos Key Distribution Center.

Referring now to FIG. 5, a Kerberos relay with dynamic filtering and a connector will be described.

The flow begins with a locally based connector 53 at 0 establishing a secure connection to a Kerberos relay with dynamic filtering 51 typically running as a SaaS application in the cloud. Although only a single connector 53 is shown, there can be multiple connectors. To do this, at startup, three listening ports are opened in the Kerberos relay 51.

Relay 51 Components
  one port to accept connections from the connector 53 to send requests for tunnels (control port).
  one port to accept connections from the connector 53 to send/receive data (data port).
  one port to accept connections from agents 21b (agent port).

The connector 53 (see below) connects to the control port when it starts. This connection is then kept open (outgoing port from connector perspective).

When an agent 21b, which is a software interface between application workload 21a and relay 51 connects to the agent port (see below), the relay will select a connector 53, or if more than one, a random connector (which is connected to the control port) and send that connector a request to create a new tunnel. Workload 21a and agent 21b are typically software running on computer 21. This request includes a tunnel id which internally in the relay is linked to the agent that initiated the connection. The connector receives this request and creates a new tunnel, consisting of a connection to the local KDC database 17 and a connection back to the relay 51 data port. When the connection to the relay data port is established, the connector first sends this tunnel id to the relay to allow the relay to link this incoming data connection to the correct agent connection.

Once this link is established between the incoming agent connection and the incoming data connection from the connector 53, any data received on the agent connection is forwarded to the data connection and any data received on the data connection is forwarded to the agent connection, based on the tunnel id that links the agent connection id and the data connection id.

When the agent connection is disconnected, the linked data connection is also disconnected.

When the data connection is disconnected, the linked agent connection is also disconnected.

Any authentication request that comes in on the agent connection will be remembered by the relay 51. Subsequently, any authorization request that comes in on the agent connection will be matched to a remembered authentication request to allow filtering to be done based on realm, user, and resource.

Connector 53 Components

As noted above at startup, 0, the connector component 53 opens a connection to the relay (on the control port) and keeps this connection open.

When a request 1 from application workload 21a via agent 21b comes into the control connection to create a new tunnel, two new connections are created: one connection to the local KDC database 17 and one connection to the relay 51 data port. This request includes a tunnel id. The tunnel id is presented to the relay when the data connection is made, allowing the relay to link this new incoming connection to the appropriate agent connection.

Any data received on the relay data connection is forwarded by connector 53 to the local KDC connection, that is, ticket granting service 13 (at 4) or authentication service 15 (at 1) as explained below. It should be noted that in an Active Directory® environment, ticket granting service 13 and authentication service 15 are combined as into a single application in which case only a single connection needs to be relayed.

Any data received on the local KDC database connection is forwarded to the relay data connection.

When the local KDC database connection is disconnected, the relay data connection is also disconnected.

When the relay data connection is disconnected, the local KDC database connection is also disconnected.

On startup, 0, the agent 21*b* opens a local listening port for application workload 21*a* to connect. Application workload 21*a* is a KDC client, that is, any application that uses a Kerberos protocol for authentication to a local resource such as database server 23.

When a local KDC client connects to this port, it then creates a new connection to the relay 51, keeping track of the link between the incoming connection from the KDC client and the outgoing connection to the relay.

Any data received on the listening port is forwarded to the linked relay connection.

Any data received on the relay connection is forwarded to the linked local connection.

When the local connection to the listening port is disconnected (KDC client disconnects), the connection to the relay is also disconnected.

When the connection to the relay is disconnected, the connection on the local listening port (to the KDC client) is also disconnected.

In this manner, as shown in FIG. 5, once the secure connection between the relay 51 and connector 53 is established, at 1, the application 21*a* sends an authorization request through the agent 21*b* to the relay 51 which allows the request after checking dynamic filter to be sent to authentication service 15. Then, as in the prior art, the request received by authentication service 15, at 2 checks to see if the user exists in the Kerberos database 17. If so, the authentication service at 3 issues the TGT which is passed through the previously created tunnel to the application workload 21*a* via the agent 21*b*. Application workload 21*a* then sends 4 a request for access to a specific resource to the TGS 13 which in turn checks 5 to verify that the user is allowed access to the requested resource such as databases server 23. If it is, the TGS at 6 issues a service ticket which is passed through the created tunnel to application workload 21*a* which then contacts 7 the database server 23 which then grants 8 access to the application.

The working details of the relay and dynamic filter 51 are as follows.

General working of the relay:

Connector 53 connects 53 to relay 51 and advertises the realm that it services (i.e., the actual name of the Kerberos realm that it provides connectivity such as company.local, company.com or cloud.company.com); the relay stores this realm as part of the connector connection. One or more connectors can connect, each servicing a specific (possibly different) realm.

A client then connects to the relay (this is typically application workload 21*a* via agent 21*b* representing the application workload). The relay receives a Kerberos request 1 from the client. The request includes a user name, and realm. The username and realm are retrieved from the Kerberos request. The request is forwarded to the correct connector (based on realm), creating a tunnel between the client 21 and the selected connector 53.

Assuming an Active Directory® (AD) environment, responses from AD received by the connector, are inspected by the filter and then forwarded to the corresponding client connection. In this connection, the filter works as follows.

When a Kerberos TGT request (such as a user logging in) is received from the client (application workload 21*a*, agent 21*b*) with the username and realm of the request, the username and realm are checked against the filter rules. Such filter rules include at least a username (including the realm as in user@company.com) and optionally a service name.

If the user is authenticated, e.g., by providing a correct password, to allow access by the user, the relay 51 forwards the request to the corresponding connector 53. If the user is not authenticated, the request is dropped and an error is returned to the application workload 21*a* via agent 21*b*.

When a Kerberos TGS request (request to access resource) is received from the connector, the Kerberos TGS request contains a service name that the request is for and the original ticket (encrypted data) that the request is based on, but not the username or realm of the user. The service name is the name of the service being requested access to, for example the name of a file server (e.g., "SRV-FILE01.LOCAL") or a database server (e.g., "ORACLE-CLOUD02.company.com") that a user wants to access. The encrypted ticket data is used to retrieve the original ticket from the internal cache (using a hash of the encrypted data), so that the username and realm of the original ticket can be retrieved.

The combination of username, realm and service name is checked against the filter rules. If the combination of username, realm and service name is allowed as a result of such checking, the Kerberos TGS request is forwarded to a connector 53 to be forwarded to a Kerberos server that is, granting service 13 or authentication service 15. Otherwise, the Kerberos TGS request is dropped and an error is returned to the agent.

In this manner, the relay 51 and connector 53 operate in a manner so that to the ticket granting service 13, authentication service 15, Kerberos database 17 and server 23, the access allowed to cloud based workload application 21*a* operates in the same manner with the same security as would be the case if application 21*a* was inside the firewall.

Figure 6A:
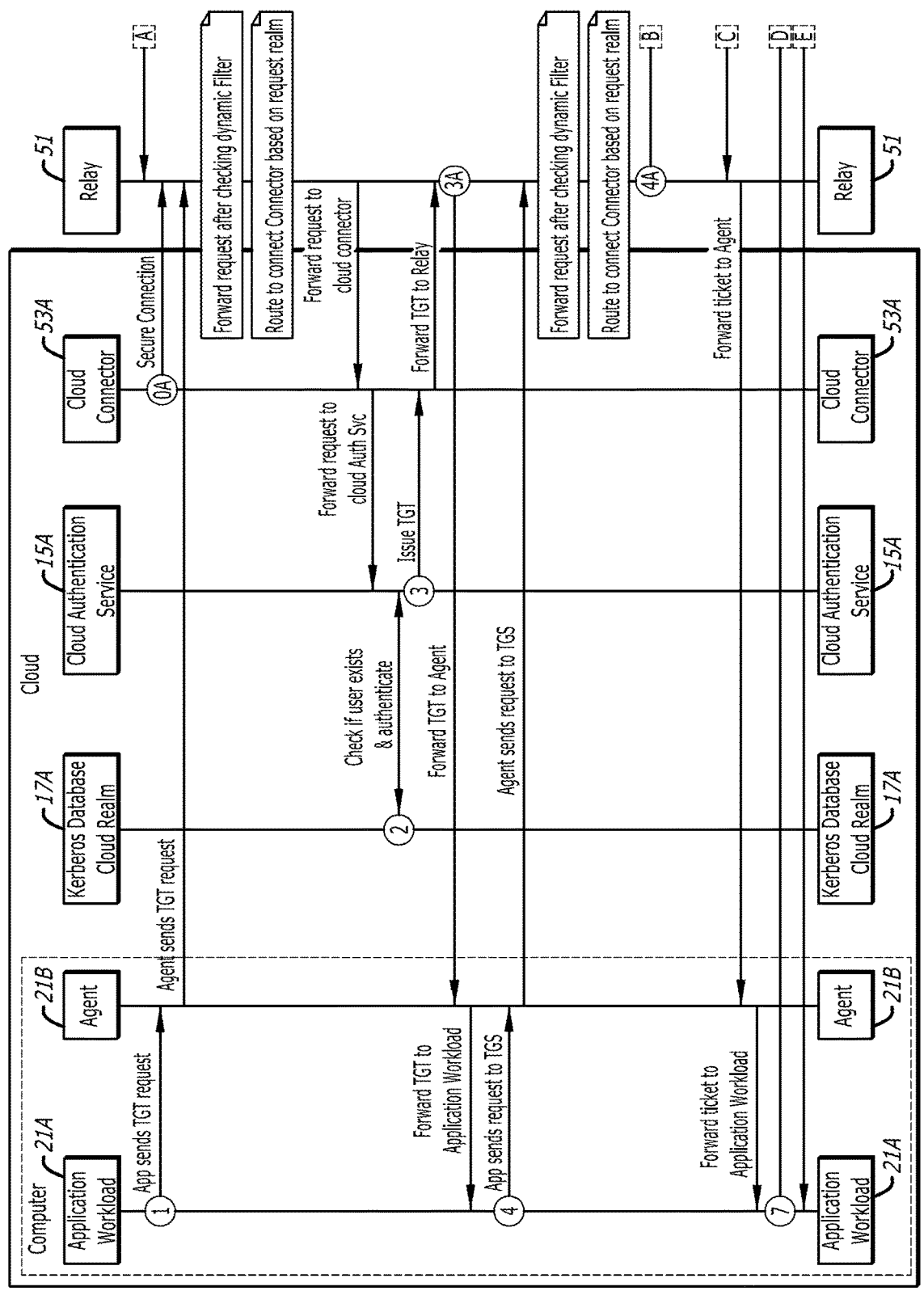
FIGS. 6A and 6B show an application workload Kerberos authentication workflow with dynamic filtering and connector according to the invention when a based cloud application sends an authentication request to a cloud based Kerberos Key Distribution Center.

The system shown in FIGS. 6A/6B is similar to FIG. 5 except that the authentication service 15*a* resides in the cloud with a cloud based Kerberos database 17*a*. A cloud connector 53*a* is also needed as explained below.

With reference to FIG. 6A, the following explains how to provide a secure connection from a cloud based application workload with a Kerberos database cloud realm, so that application workload 21*a* can connect and authenticate to a local database server 23 behind a firewall.

Figure 6B:
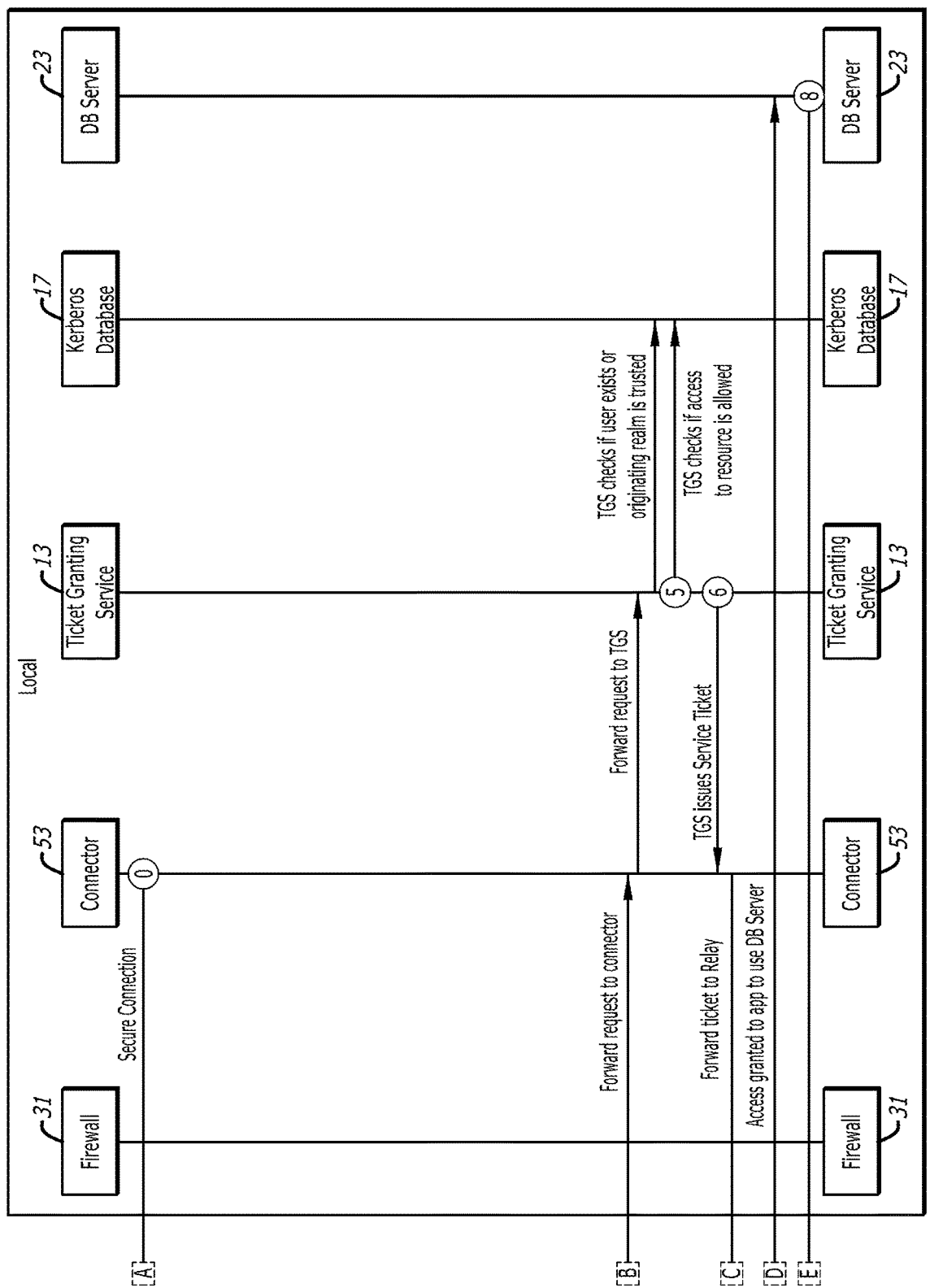

Application workload 21*a* runs in a cloud environment, such as Amazon® Web Services (AWS) without direct line-of-sight to a local realm, such as Active Directory® (AD), shown in FIG. 6B as Ticket Granting Service 13.

Database server 23 is a local server within the local realm. The local realm is protected by a firewall 31 with rules which allow or prevent inbound connections to the database server.

Agent 21*b* and application workload 21*a* run on the same work station/computer 21 as in FIG. 5.

As in FIG. 5, in FIG. 6A, the Kerberos configuration on work station 21 is changed to point to a local endpoint provided by agent 21*b* so Kerberos requests made by the application workload 21*a* are handled by agent 21*b*.

Connector 53 and cloud connector 53*a* connect securely to relay 51 as soon as they are started. Because the connection from connector 53 is an outbound connection, the firewall normally does not prevent the connection to relay 51 from being made. This established connection is then used later on to send requests and replies back and forth, with inbound requests allowed once the connection is authenticated by cloud authentication service 15 and Kerberos database cloud realm 17*a*.

Since application workload 21*a* needs to connect to database server 23 in FIG. 6B; to be able to get access, it first needs to authenticate the user credentials that it uses.

To do this, application workload 21*a* issues a request 1 for a TGT. Because agent 21*b* has been configured as the Kerberos server on workstation 21, this request ends up with the agent, which sets up a secure connection to the relay 51 and forwards the request to the relay.

The relay 51 in FIG. 6A applies dynamic filtering to make sure the request is allowed to be made (realm/user) and selects the cloud connector 53*a* as the connector where it should forward the TGT request. This is based on the realm in the Kerberos request being the cloud realm, which is the realm where the user exists.

Cloud connector 53*a* forwards the TGT request to the cloud authentication service 15*a*, which checks 2 the user credentials in the Kerberos database cloud realm 17*a* and issues 3 a valid TGT ticket if the user credentials are valid.

This ticket is received by the cloud connector 53*a*, which forwards it to the relay 51 over the already established connection that the cloud connector has to the relay.

The relay 51 then forwards 3*a* the reply/ticket to the agent 21*b* over the secure connection that the agent has previously established.

The agent in turn forwards the Kerberos reply (ticket) to the application workload 21*a*.

The application workload 21*a* now has a valid Ticket Granting Ticket, issued by the cloud authentication service 15*a*.

The next step is for the application workload 21*a* to request access to a desired local resource, such as database server 23. Is does this by requesting a ticket from the TGS for the realm that the database server is in (this would be the local AD realm/domain), based on the TGT that is has just requested.

That is, application workload 21*a* requests 4 a ticket for the database server 23 resource.

This request ends up with the agent 21*b* because the agent has an open listening port which has been configured on workstation 21 as a Kerberos server.

The agent 21*b* sets up a secure connection to the relay 51 and forwards the request to the relay.

Relay 51 again applies dynamic filtering to determine if the request for this realm/user/resource is allowed and then selects connector 53 based on the realm in the request and forwards the request to the connector 53. This happens over the existing connection that was established by the connector on start up.

The connector 53 now forwards the request to the Ticket Granting Service 13.

The Ticket Granting Service 13 checks the request (in this case the request is based on a TGT ticket that comes from another realm, so the TGS has to check domain trusts), checks 5 to determine if the user has access to the requested resource, database server 23 in this case, and issues 6 a ticket that grants access to this resource.

This reply (ticket) is received by the connector 53 and forwarded to relay 51 over the already established connection.

Relay 51 then forwards the reply (ticket) to the agent 21*b*.

Agent 21*b* forwards the reply (ticket) to the application workload 21*a*, which now has a valid ticket to access the resource that it requested.

Application workload 21*a* now connects 7 to the database server 23 which has been made accessible thru the cloud by creating a firewall configuration that allows the connection to be made and presents the ticket. The database server 23 checks the ticket and, if valid, allows 8 access to the database.

Although the FIG. 6A/6B embodiment requires a cloud based Kerberos database 17*a* and a local Kerberos database 17, in an AD environment, the idea of trusted domains in AD is that the two AD databases (Kerberos database cloud realm 17*a* and local Kerberos database 17) with users and resources do not have to be synced to be able to authenticate users existing in one AD database against resources existing in another AD database. In this case, the user is authenticated in the cloud service AD (because that is where the user exists), gets a valid Ticket Granting Ticket (TGT), uses this TGT to request an access ticket from the TGS in AD (the local Kerberos database). This local AD does not have this user in its own database, but it trusts the authentication and the ticket from the cloud service AD (because it comes from a trusted domain) and just checks if the user that is mentioned in the request has access to the resource that is mentioned in the request (the database server 23 in this case). If access is granted, a valid access ticket is sent back to the application workload 21*a*.

As shown above, the user account can exist in a domain other than the domain where the resources exists (i.e., servers that the user needs access to which reside in another domain). To make such scenarios work, the domain of the server (called the resource domain) and the domain of the user account (called the account domain) engage in a trust relationship, in which authentication decisions made in the account domain are trusted in the resource domain. In such trust relationships, the resource domain is called the trusting domain, while the account domain is called the trusted domain. Trust relationships are established by administrators of the two domains.

The reasons for using trusted (separate) domains with authentication service 15*a* with a Kerberos database 17*a* as shown in FIG. 6A/6B is because the cloud domain is where the users initially authenticate (log on) and the internal/local domain is where the resources are located. In a one-way trust, Domain A trusts Domain B. What this means is that Domain A is trusting Domain B's users and granting them access to its resources. Domain A is the trusting domain, and Domain B is the trusted domain. With a one-way trust, the trusted domain contains the user resources that require access, and the trusting domain contains the resources that are being accessed. In this case the domain (realm) with the users is the cloud domain, the domain with the resources is the internal domain, so the internal domain trusts the (users from the) cloud domain, which would make the cloud domain the trusted domain, and the internal domain the trusting domain. Keeping domains separate provides additional security by limiting the attack surface of a malicious user.

The FIG. 6A secure connection must be created on startup at 0 as in FIG. 5. However, the secure connection is established between connector 53 and relay 51, and between relay 51 and cloud connector 53*a*. Since authentication service 15*a* and Kerberos database 17*a* are also in the cloud with application workload 21*a*, the authentication request 1 sent by application 21*a* via agent 21*b* is processed in the cloud by authentication service 15*a* and Kerberos database 17*a* directly with relay 51 via cloud connector 53*a*. Cloud connector 53*a*, together with relay 51 and connector 53, is part of the infrastructure to serve as an interface between agent 21*a* and authentication services 15*a* and 13. Agent 21*a* may have "line-of-sight" to the cloud authentication service 15*a*, but will never have "line-of-sight" to the internal realm with ticket granting service 13 and Kerberos database 17.

Figure 7:
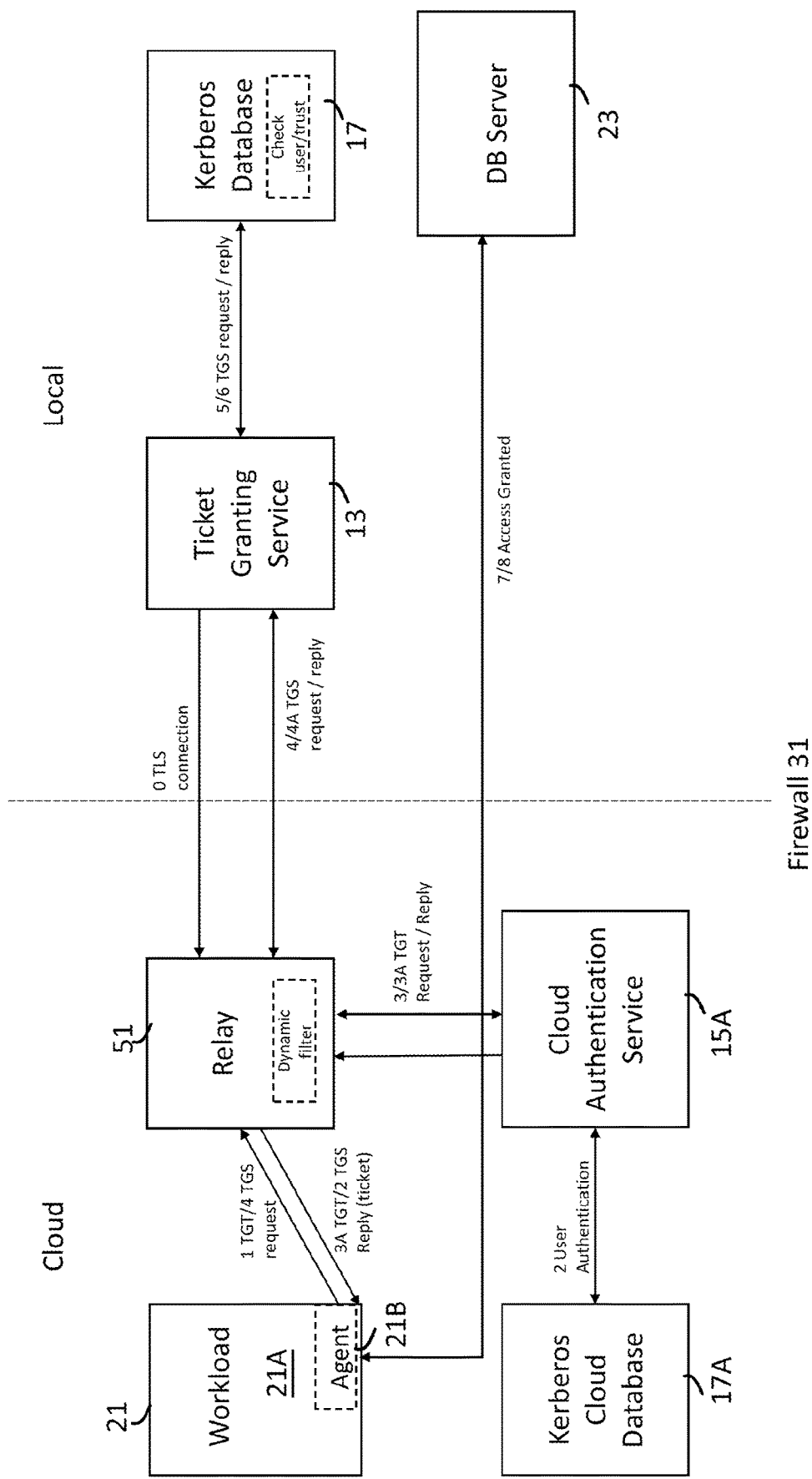
FIG. 7 shows the invention with the relay component implemented as a SaaS along with a cloud based authentication service and Kerberos using, for example, a cloud based web service.

FIG. 7 shows in block diagram form an implementation of the FIG. 6A/6B embodiment of the invention. Connectors 53 and 53a which connect to the relay 51, each advertising the realm that they connect as explained in FIG. 6A/6B, though necessary, are omitted in FIG. 7 for simplicity and can be considered to be part of authentication services 15 and 15a.

In FIG. 7, after a secure connection is established between connector 53 and relay 51 as described in FIG. 6A/6B, application workload 21a via agent 21b creates a transport layer security (TLS) tunnel over port 443 to allow outbound traffic from the computer running the application workload 21a and agent 21b to the relay 51 through firewall 31 as described above. A TLS tunnel is also created between relay 51 and cloud authentication service 15a so that an issued TGT can be returned as described with reference to FIG. 6A/6B.

In operation, relay 51 in turn communicates with connector 53 with a TGT and TLS being created as described above with reference to FIG. 6A/6B. Connector 53 communicates with Kerberos database 17 which communicates with database server 23 in a manner similar to the interactions described above between Kerberos database 17 and server 23 in connection with FIG. 5.

As shown in FIG. 7, all interactions involving workload 21a are between agent 21b and relay 51, and server 23, after all authorizations and authentications are completed. Relay 51 communicates with cloud authentication service 15a and ticket granting service 13 through firewall 31 via connector 53 and cloud connector 53a as in FIG. 6A/B.

An embodiment of the invention may be a machine-readable medium having stored thereon instructions which cause a processor to perform operations as described above. In other embodiments the operations might be performed by specific hardware components that contain hardwired logic. Those operations might alternatively be performed by any combination of programmed computer components and custom hardware components.

A machine-readable medium may include any mechanism for storing or transmitting information in a form readable by any type of processing device.

Although specific examples of how the invention may be implemented are described, the invention is not limited by the specified examples, and is limited only by the scope of the following claims.

We claim:

1. A system for providing secure access to an organization's internal server resources on an internal network by an application running on an external network comprising:
    an agent configured to accept queries from the application running on said external network and pass said queries to a relay with a dynamic filter running on said external network;
    said relay configured to i) establish a secure connection with a local connector through a firewall to protect said organization's internal server resources running on said internal network, and ii) pass requests from said application via said agent to a cloud authentication service running on said external network, said cloud authentication service to confirm that a user of said application is authorized to access said internal network and if authorized, issue an authentication ticket,
    a cloud connector running on said external network configured to receive said issued authentication ticket and pass said issued authentication ticket via said relay for receipt by said application via said agent;
    said relay further configured to receive from said application via said agent a request to access a specific internal server resource based on said issued authentication ticket, and pass said request through said secure connection to said connector if said user is authenticated, said connector further configured to pass said request to a ticket granting service running on said internal network, said ticket granting service to verify that said user is authorized to access the specific internal server, and if authorized to issue a service ticket provided to said connector to pass said service ticket via said relay and said agent to said application, wherein said application, based on said service ticket, is granted access to said specific internal server.

2. The system defined by claim 1 wherein said ticket granting service verifies that said user is authorized to access the specific internal server by checking a database on said internal network to check if said user exists in said database and is allowed access to the local resource, or said request received by said ticket granting service originates from a trusted realm.

3. The system defined by claim 1 wherein said dynamic filter uses rules wherein at least a username of said user and a realm from which said queries originate are checked.

4. The system defined by claim 1 wherein said relay routes to said connector based on a realm from which said queries originate.

5. A method for providing secure access to an organization's internal server resources on an internal network by an application running on an external network comprising:
    accepting by an agent queries from the application running on said external network and passing said queries to a relay with a dynamic filter running on said external network;
    establishing by said relay a secure connection with a local connector through a firewall to protect said organization's internal server resources running on said internal network, and ii) passing requests from said application via said agent to a cloud authentication service running on said external network;
    confirming by said cloud authentication service that a user of said application is authorized to access said internal network and if authorized, issuing an authentication ticket, receiving by a cloud connector running on said external network said issued authentication ticket and passing said issued authentication ticket via said relay for receipt by said application via said agent;
    said relay further receiving from said application via said agent a request to access a specific internal server resource based on said issued authentication ticket, and passing said request through said secure connection to said connector if said user is authenticated, said connector passing said request to a ticket granting service running on said internal network, verifying by said ticket granting service that said user is authorized to access the specific internal server, and if authorized issuing a service ticket provided to said connector to pass said service ticket via said relay and said agent to said application, granting access by said application based on said service ticket to said specific internal server.

* * * * *